US007769828B2

(12) United States Patent
Nadel et al.

(10) Patent No.: US 7,769,828 B2
(45) Date of Patent: Aug. 3, 2010

(54) SYSTEM FOR PROVISIONING TIME SHARING OPTION (TSO) AND INTERACTIVE PRODUCTIVITY SYSTEM FACILITY (ISPF) SERVICES IN A NETWORK ENVIRONMENT

(75) Inventors: Douglas G. Nadel, Apex, NC (US); Paul A. Meaney, Perth (AU)

(73) Assignee: International Business Machines Corporation, Armonk, NY (US)

( * ) Notice: Subject to any disclaimer, the term of this patent is extended or adjusted under 35 U.S.C. 154(b) by 479 days.

(21) Appl. No.: 11/868,069

(22) Filed: Oct. 5, 2007

(65) Prior Publication Data

US 2009/0094315 A1 Apr. 9, 2009

(51) Int. Cl.
*G06F 15/16* (2006.01)
(52) U.S. Cl. .................. 709/219; 709/203; 709/227
(58) Field of Classification Search .................. 709/219
See application file for complete search history.

(56) References Cited

U.S. PATENT DOCUMENTS 5,394,554 A * 2/1995 Elko et al. .................. 709/224
2004/0068572 A1 * 4/2004 Wu ............................. 709/229
2004/0133684 A1 * 7/2004 Chan et al. .................. 709/227
2006/0117106 A1 * 6/2006 Abdo et al. .................. 709/227
2006/0126565 A1 * 6/2006 Shaheen ...................... 370/331
2007/0038759 A1 * 2/2007 Hanson et al. ............... 709/227
2007/0198656 A1 * 8/2007 Mazzaferri et al. .......... 709/218

* cited by examiner

*Primary Examiner*—Jeffrey Pwu
*Assistant Examiner*—Willow Noonan
(74) *Attorney, Agent, or Firm*—Dillon & Yudell LLP (57) ABSTRACT

A method, system and computer program product for dynamically establishing a client's Time Sharing Option (TSO) and/or Interactive Productivity System Facility (ISPF) session and maintaining the client's TSO/ISPF session on a zero-downtime/operating system (z/OS) host over multiple service calls. A session provisioning and maintenance (SPM) utility determines whether a TSO/ISPF session exists for a client making a request for a TSO/ISPF service. When a TSO/ISPF session does not exist for the client, session establishment is initiated by generating a TSO initialization module in a new UNIX System Services (USS) process. Session establishment involves initializing a user's own TSO address space through USS and using USS service call API's to make TSO/ISPF service call requests in the TSO address space. The SPM utility maintains the client's TSO/ISPF session over multiple service calls, bypassing the overhead of having to establish a new session for every service request which requires TSO/ISPF services.

6 Claims, 4 Drawing Sheets

SYSTEM FOR PROVISIONING TIME SHARING OPTION (TSO) AND INTERACTIVE PRODUCTIVITY SYSTEM FACILITY (ISPF) SERVICES IN A NETWORK ENVIRONMENT

BACKGROUND

1. Technical Field

The present invention generally relates to computer network systems and in particular to multi-session continuity in computer network systems.

2. Description of the Related Art

Time Sharing Option (TSO) and Interactive Productivity System Facility (ISPF), which were originally designed to provide interactive or batch oriented interfaces to MVS system and host application services, do not provide a means of maintaining a stateful connection to networked applications such as web and client server applications.

Current implementations to provide TSO and ISPF services to networked clients include submitting a batch job which runs TSO or starting and stopping a TSO session on each call from the client to the host. Terminal oriented TSO and ISPF services are also currently provided by applications which emulate 3270 terminals by reading and writing 3270 data streams, a process often referred to as 'screen scraping'.

Establishment of a user session involves TSO initialization, data set allocations and ISPF initialization before an ISPF service call request may be made. The current methods of providing TSO/ISPF services suffers from the disadvantage of having to incur the overhead involved in having to establish a new session for every service request which requires TSO or ISPF services.

SUMMARY OF ILLUSTRATIVE EMBODIMENTS

Disclosed are a method, system and computer program product for dynamically establishing a client's Time Sharing Option (TSO) and/or Interactive Productivity System Facility (ISPF) session and maintaining the client's TSO/ISPF session on a zero-downtime/operating system (z/OS) host over multiple service calls. A session provisioning and maintenance (SPM) utility determines whether a TSO/ISPF session exists for a client making a request for a TSO/ISPF service. When a TSO/ISPF session does not exist for the client, session establishment is initiated by generating a TSO initialization module in a new UNIX System Services (USS) process. Session establishment involves initializing a user's own TSO address space through USS and using USS service call API's to make TSO/ISPF service call requests in the TSO address space. The SPM utility maintains the client's TSO/ISPF session over multiple service calls, bypassing the overhead of having to establish a new session for every service request which requires TSO/ISPF services.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The illustrative embodiments provide a method, system and computer program product for dynamically establishing a client's Time Sharing Option (TSO) and/or Interactive Productivity System Facility (ISPF) session and maintaining the client's TSO/ISPF session on a zero-downtime/operating system (z/OS) host over multiple service calls. A session provisioning and maintenance (SPM) utility determines whether a TSO/ISPF session exists for a client making a request for a TSO/ISPF service. When a TSO/ISPF session does not exist for the client, session establishment is initiated by generating a TSO initialization module in a new UNIX system services (USS) process. Session establishment involves initializing a user's own TSO address space through USS and using USS service call API's to make TSO/ISPF service call requests in the TSO address space. The SPM utility maintains the client's TSO/ISPF session over multiple service calls, bypassing the overhead of having to establish a new session for every service request which requires TSO/ISPF services.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

Figure 1:
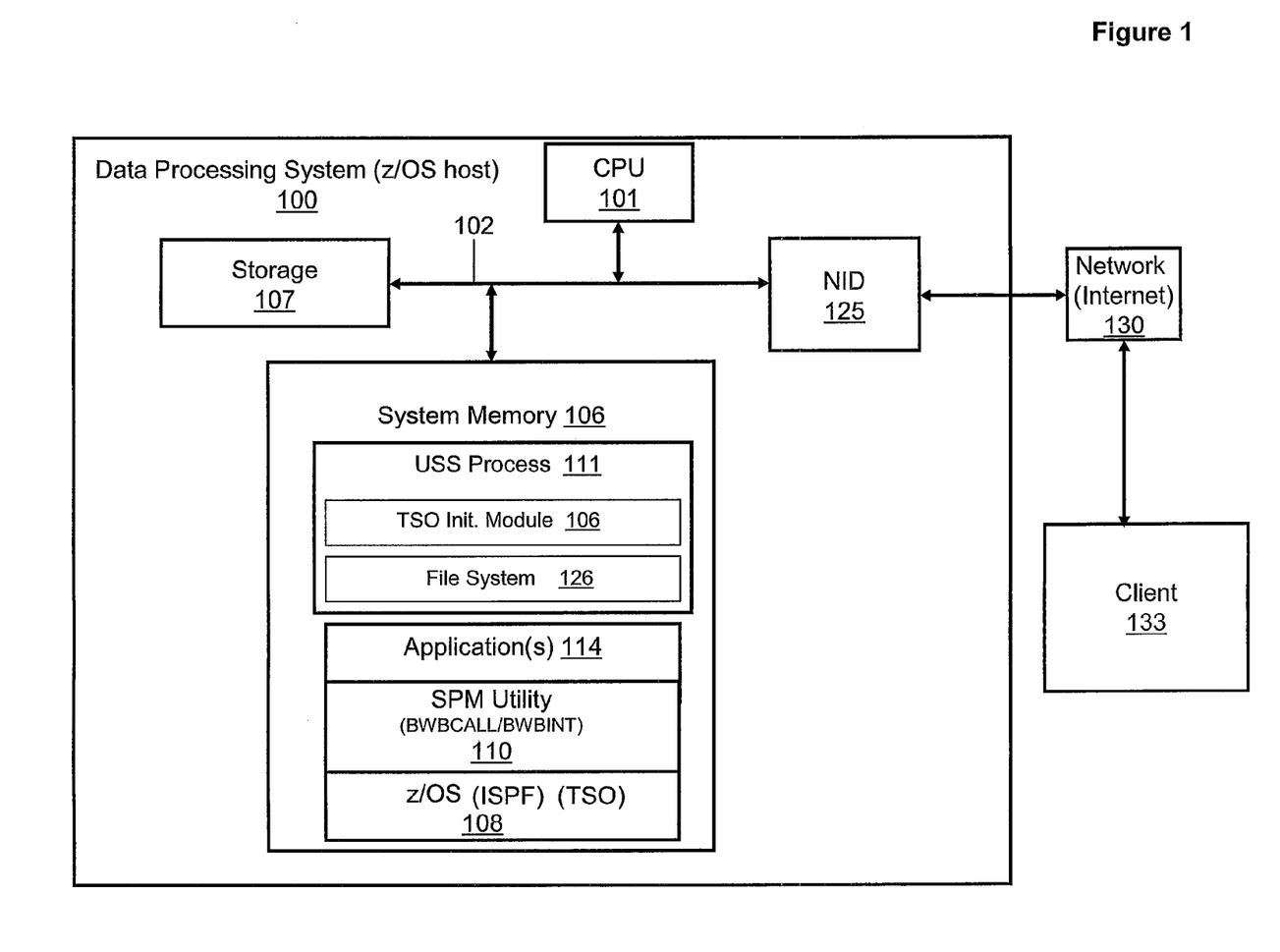
FIG. 1 is a block diagram representation of a data processing system, according to one embodiment of the invention.

With reference now to FIG. 1, there is depicted a block diagram representation of a mainframe data processing system (and connected network) and, in particular, an example z/OS host (server). DPS 100 comprises at least one processor or central processing unit (CPU) 101 connected to system memory 106 via system interconnect/bus 102. DPS 100 may have a system console and keyboard for input/output (I/O) functionality, but such functionality is not relevant to the invention. DPS 100 also comprises storage 107, within which data/instructions/code may be stored.

DPS 100 is also illustrated with a network interface device (NID) 125, with which DPS 100 connects to one or more clients 133 via an access network, such as the Internet 130. In the described embodiments, Internet 130 is a worldwide collection of networks and gateways that utilize the Transmission Control Protocol/Internet Protocol (TCP/IP) suite of protocols to communicate with one another. Of course, network access may also be provided via a number of different types of networks, such as an intranet, a local area network (LAN), a virtual private network (VPN), or other wide area network (WAN) other than the Internet, for example.

Notably, in addition to the above described hardware components of DPS 100, various features of the invention are completed via software (or firmware) code or logic stored within memory 106 or other storage (e.g., storage 107) and executed by CPU 101. Thus, illustrated within memory 106 are a number of software/firmware components, including operating system (OS) 108 (which may be the z/OS of International Business Machines (IBM), having ISPF and TSO components, or other OS exhibiting similar functionality as the z/OS), applications 114, session provisioning and maintenance (SPM) utility 110. As illustrated, DPS 100 provides z/OS host functionality with a number of software components, including TSO initialization module 120, and UNIX System Services (USS) 111. Based on the specific implementation provided, the z/OS may be run in a real or emulated (virtualized) environment. In actual implementation, applications 114, SPM utility 110, TSO module 120 and USS 111 may be combined as a single application collectively providing the various functions of each individual software component when the corresponding code is executed by the CPU 101. For simplicity, SPM utility 110 is illustrated and described as a stand alone or separate software/firmware component, which provides specific functions, as described below.

CPU 101 executes SPM utility 110 as well as OS 108, which supports the user interface features of SPM utility 110. In the illustrative embodiment, SPM utility 110 generates/provides several graphical user interfaces (GUI) to enable user interaction with, or manipulation of, the functional features of the utility (110). Among the software code/instructions provided by SPM utility 110, and which are specific to the invention, are: (a) code for determining whether a Time Sharing Option (TSO) and/or an Interactive Productivity System Facility (ISPF) session exists for a client making a request for a TSO service or an ISPF service; (b) code for generating TSO initialization module 120 in a new UNIX System Services (USS) process 111, wherein said initialization module is a program running within UNIX System Services 111 that generates an individual TSO session; and (c) code for maintaining a client's TSO and/or ISPF sessions over multiple service calls. For simplicity of the description, the collective body of code that enables these various features is referred to herein as SPM utility 110. According to the illustrative embodiment, when CPU 101 executes SPM utility 110, DPS 100 initiates a series of functional processes that enable the above functional features as well as additional features/functionality, which are described below within the description of FIGS. 2-4.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation of Armonk, N.Y.

Figure 2:
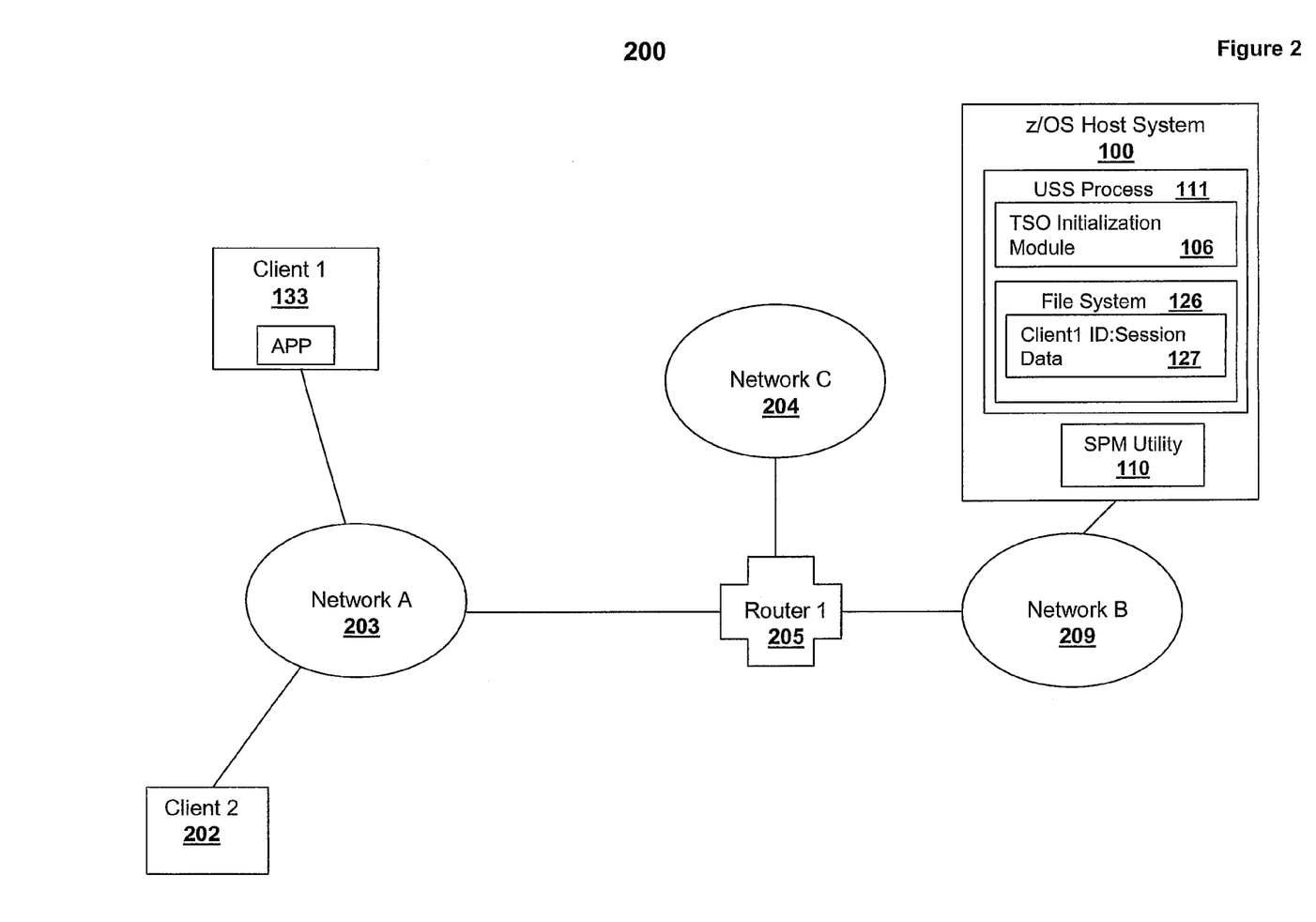
FIG. 2 illustrates a network, in which a z/OS host provides TSO and ISPF services to a client, in accordance with one embodiment of the invention.

With reference now to FIG. 2, a network, in which a z/OS host provides TSO and ISPF services to a client, is illustrated, according to an illustrative embodiment of the present invention. Network 200 comprises client 1 133 and client 2 202 which both connect to router 1 205 via network A 203. Network 200 also comprise network B 209 and network C 204, which are both connected to router 1 205. Connected to network B 209 is z/OS host 100. The z/OS host 100 comprises USS process 111. USS process 111 comprises TSO initialization module 106 and file system 126. The z/OS host 100 also comprises SPM utility 110.

In network 200, client 1 133 sends a request to z/OS host 100, which request requires TSO/ISPF services. Client 1 133 is a service requestor that exists on a platform other than the z/OS server (running the z/OS operating system) and connects to z/OS server 100 to make requests for TSO/ISPF services. TSO initialization module 106 is a program running within USS process 111 that generates an individual TSO session (which subsequently generates an ISPF session). SPM utility 110 provides the ability to maintain state data (within file system 126) between client calls, which ultimately allows TSO/ISPF session maintenance over multiple client service calls.

When client 1 133 requests a TSO or ISPF service, a connection to USS 111 is required and is provided through any mechanism that supports command invocation and data transfer. The connection may be made through protocols such as HTTP, direct TCP/IP socket connections, or any other means through which data and commands may be exchanged between client 1 133 and z/OS server 100. When an initial service call is made that requires TSO or ISPF services, the session interface module is called as a command within USS 111, and details of the call, such as a command descriptor or a set of parameters, are read from the standard input stream (stdin). The session interface module (which resides within USS process 111) determines if an existing TSO session exists. If no TSO/ISPF session exists for client 1 133, then a TSO initialization module is generated under USS 111 to run independently as a USS process. Though initiated as a USS process, this TSO initialization address space is a started task (i.e., the default started task name is the user's logon id plus a number) and is displayable on z/OS through existing interfaces such as operator commands or SDSF. The generated TSO initialization module stores its session process identifier (PID) in the session file 127 of client 1 133 located on z/OS server 100 in file system 126 of USS 111. The location of session file 127 is configurable.

The TSO initialization module then initializes TSO by attaching the Terminal Monitor Program (TMP). The TSO TMP calls the ISPF initialization module. The ISPF initialization module (1) reads a configuration file to determine the required ISPF data set allocations, (2) allocates the required data sets and then (3) issues an ISPSTART command to initialize ISPF. The ISPSTART command specifies that ISPF should start the command interface module. When ISPF starts, ISPF calls the command interface module, which subsequently handles all service call requests, processes those requests, and streams the output back to client 1 133.

The TSO/ISPF session, under the control of the command interface module, remains in a wait state within a loop, waiting for service request input from client 1 133. Client 1 133 communicates requests to the TSO/ISPF session through the connection to USS 111. The session interface module running in USS 111 forwards the request (command) to the command interface module running in the TSO address space using FIFO pipe files to signal to the session that a request has been made. Notably, the use herein of UNIX pipes is provided solely as an example. Other mechanisms or methods of data and signal transmission maybe supported between the various components, in alternate embodiments, and the use of a specific mechanism is not intended to be limiting on the invention. The session interface module optionally uses that same pipe to transfer the command data. Alternatively, the session interface module running in USS 111 may forward only an indicator that a command exists in a shared, external location such as a UNIX file or a z/OS data set.

The command interface within the TSO/ISPF session then reads the input service request from the pipe or an external source. The command module processes the service request. The command may be in any form that the command interface understands. The command interface executes the command and sends the output to the standard output stream (stdout) which output is captured in a service response file existing in a configurable location in the UNIX file system. The command interface module then signals to the session interface module (via the signal FIFO pipe) that the request has been completed and is provided as a response output. The session interface module reads the response output and re-directs the output back through the transport layer and to client 1 133.

Figure 3:
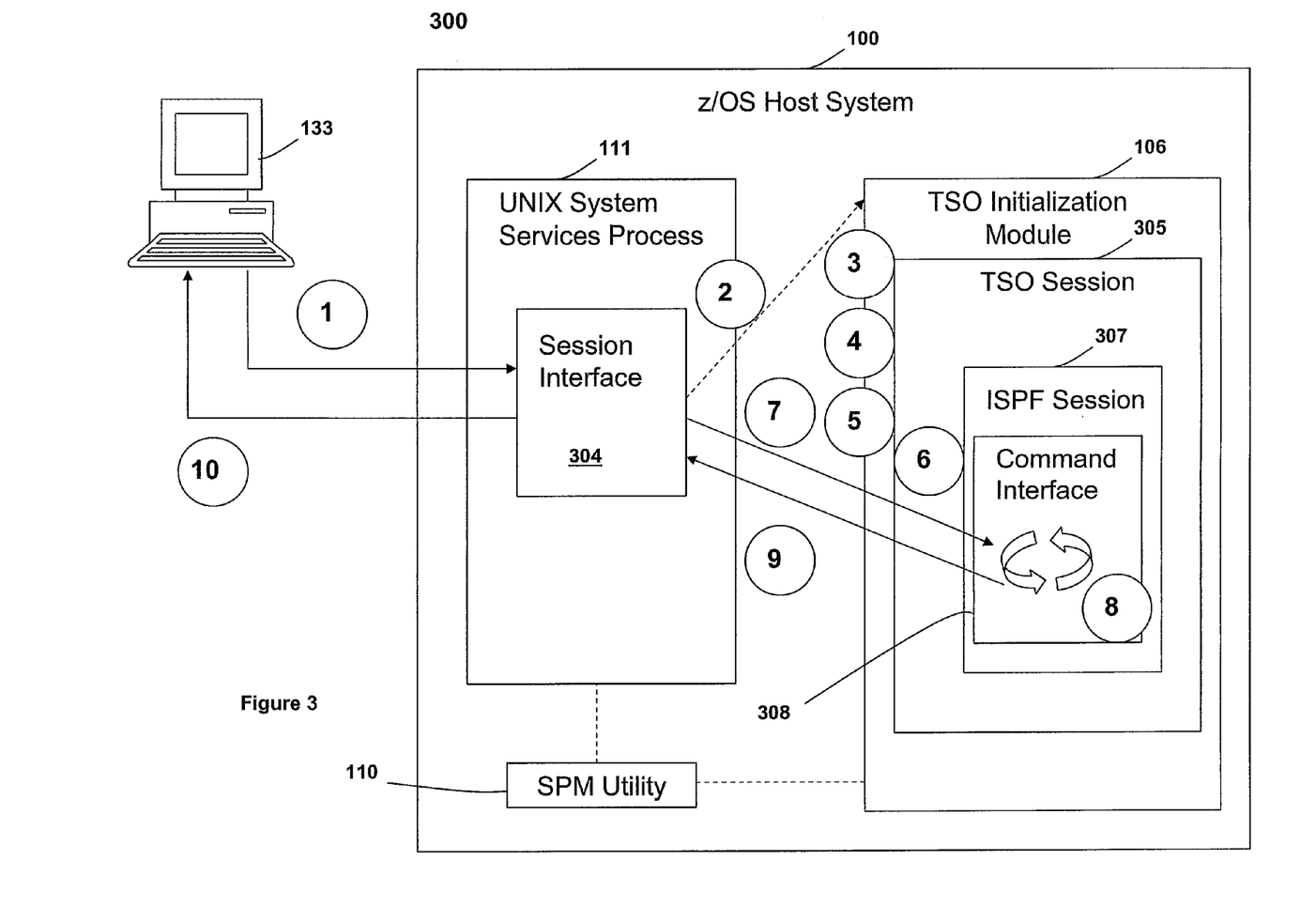
FIG. 3 is a block diagram of a client connecting to a z/OS server, illustrating the processing structure of a service request and the creation of a TSO/ISPF address space, according to one embodiment of the invention.

FIG. 3 is a block diagram illustrating the processing structure of a service request and the creation of a TSO/ISPF address space when a client connects to a z/OS server, according to an illustrative embodiment of the present invention. System 300 comprises client 133 connected to z/OS host/server 100. z/OS host 100 comprises USS process 111. Running within USS process 111 is session interface 304. z/OS host 100 also comprises TSO initialization module 106 which further comprises TSO session 305. TSO session 305 comprises ISPF session 307, within which, command interface 308 runs. Additionally, z/OS host 100 comprises SPM utility 110.

The following enumerated steps outline the processing structure for the establishment of client's TSO/ISPF and the maintenance of the session over multiple service calls.

1. Client 133 sends a request to z/OS host 100.
2. Session interface 304 receives the request, checks for an existing TSO address space and if not found, generates TSO Initialization Module 106 in new USS process 111.
3. TSO Initialization Module 106 starts and initializes TSO session 305 by calling/attaching the terminal monitor program (TMP).
4. TSO session 305 starts, writes a session file and starts the ISPF initialization interface.
5. The ISPF initialization module sets up the ISPF data sets and starts ISPF (session) 307.
6. ISPF command interface 308 starts and waits for command data.
7. Session interface 304 transfers command data to command interface 308 via a pipe or other means.
8. Command interface 308 executes the command and sends the output to stdout.
9. The output data is routed to session interface 304.
10. Session interface 304 returns the output data to client 133.

Figure 4:
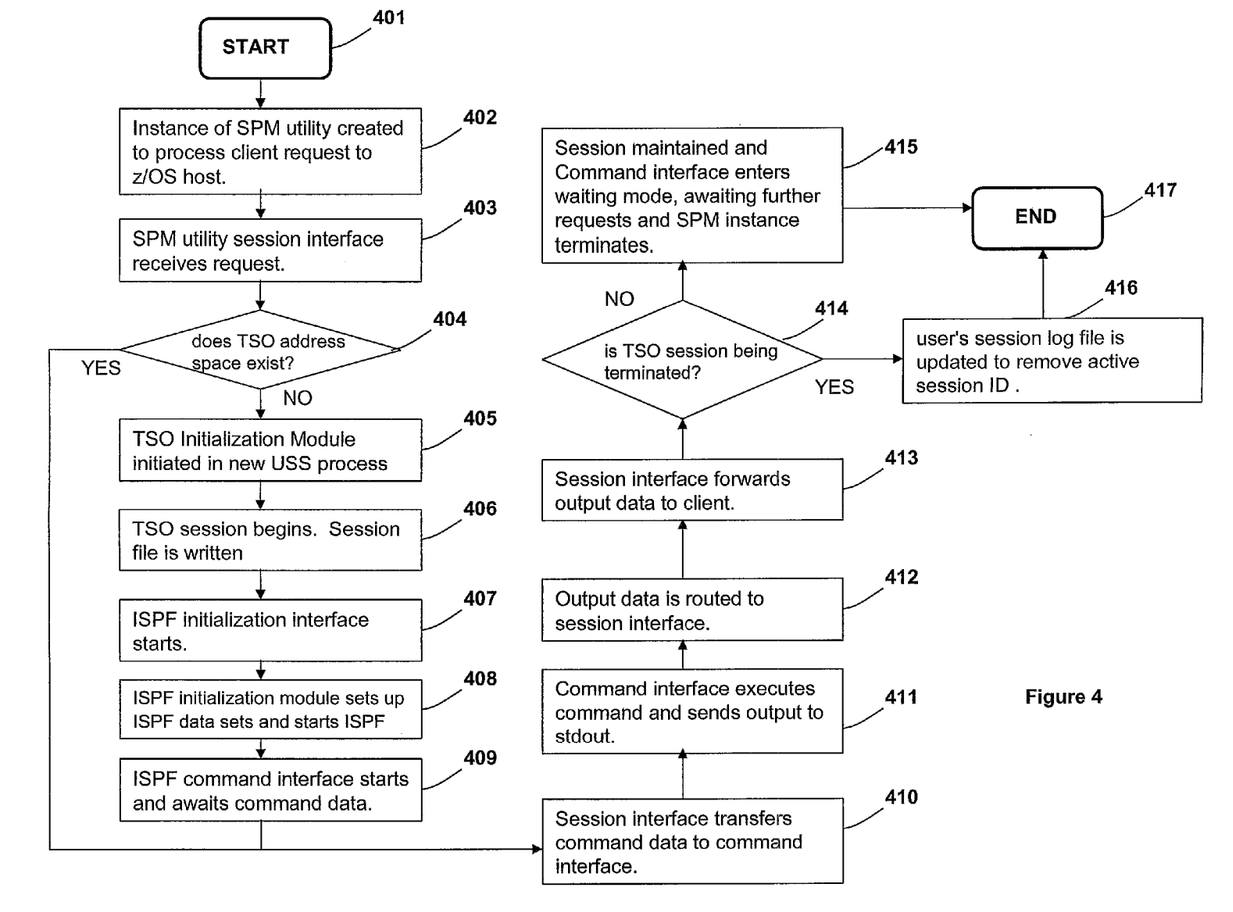
FIG. 4 is a flow chart illustrating the dynamic establishment of a TSO/ISPF session for a connecting user and the maintenance of the session on z/OS over multiple service calls, in accordance with one embodiment of the invention.

These steps are revisited, expanded and farther elaborated upon in FIG. 4, which is a flow chart illustrating the dynamic establishment of a TSO/ISPF session and the maintenance of the session on z/OS over multiple service calls, in accordance with one embodiment of the invention. Furthermore, FIG. 4 illustrates a method by which the above processes of the illustrative embodiments are completed. Although the method illustrated in FIG. 4 may be described with reference to components shown in FIGS. 1-3, it should be understood that this is merely for convenience and alternative components and/or configurations thereof can be employed when implementing the various methods. Key portions of the method may be completed by SPM utility 110 executing within DPS 100 (FIG. 1) and controlling specific operations of/on DPS 100, and the method is thus described from the perspective of either/both SPM utility 110 and DPS 100.

The process of FIG. 4 begins at initiator block 401 and proceeds to block 402, at which an instance of session provisioning and maintenance (SPM) utility 110 is created to process requests sent by a client to a z/OS host for a TSO/ISPF service. Requests for services made to the TSO address space are sent through a UNIX pipe (a file-like object that allows transmission between processes) or other transmission mechanism. SPM utility 110 also monitors (the actions and the results of) the following steps. At block 403, the SPM utility session interface receives the request. Specifically, the session interface is called as a command within UNIX System Services (USS) and details of the call, such as a command descriptor or a set of parameters are read from the standard input stream (stdin). The session interface module determines if an existing TSO session exists, as shown at decision block 404. Session establishment is independent of the transport facility used from the client platform to the z/OS server. Transport connection may be via the HTTP protocol (web based services) direct TCP/IP socket connections, or any other means through which data and commands may be exchanged between the client and z/OS host. If at block 404, the session interface determines that a TSO/ISPF session does exist for that user, then the process moves directly to block 410, at which the session interface transfers command data to the command interface. However, if at block 404, the session interface determines that no TSO/ISPF session exists for that user, then a TSO initialization module is generated under USS to run independently as a USS process, as shown at block 405.

The generated TSO initialization module stores its session process identifier (PID) in the user's session file located on the host in the USS file system, at block 406. The TSO initialization module then initializes TSO by attaching the Terminal Monitor Program (TMP). The TSO TMP calls the ISPF initialization module, at block 407. At block 408, the ISPF initialization module reads a configuration file to determine the required ISPF data set allocations, allocates the required data sets, and then issues an ISPSTART command to initialize ISPF. The ISPSTART command specifies that ISPF starts the command interface module. When ISPF starts, it calls the command interface module, as shown at block 409.

At block 410, the session interface transfers command data to the command interface. The command interface then executes the command and sends the output to the standard output stream (stdout), as shown at block 411. At block 412, the output data is routed to the session interface. The session interface forwards the output data to the client, as shown at block 413. At decision block 414, SPM utility 110 determines whether the TSO/ISPF session is being maintained or terminated, following the fulfillment of a client's request. The TSO/ISPF session may be terminated in one of the following ways: (1) a Timeout, whereby a configurable setting specifies an amount of time which must pass after the completion of the last serviced request, and if this time passes without the receipt of another service request, the TSO/ISPF session is terminated; (2) a Shutdown request, whereby, when the command interface receives and processes a shutdown request, the command interface ceases to wait any longer for commands, causing the TSO session to terminate; and (3) a cancel request, whereby, if the session interface receives a request to cancel the TSO session, the session interface issues the appropriate commands to force the termination of the generated TSO address space(s).

A user may successfully kill only those sessions which were generated on a user's behalf. Thus, if at block 414, SPM utility 110 determines that any of these actions/requests to terminate a session occurred, the user's session log file is updated to remove that active session ID, as shown at block 416. Following block 416, the process ends at termination block 417. However, if at block 414, SPM utility 110 determines that none of these actions to terminate a session were occurred, the process moves to block 415, at which, SPM utility 110 maintains (or continues to maintain) the TSO/ISPF session over multiple service calls, and the command interface enters a waiting mode, in which, further client requests are awaited and the SPM instance terminates. The process then ends at block 417.

In the flow chart above, one or more steps of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a computer network system comprising a client and a server operating as a zero-downtime/operating system (z/OS) host, a method comprising:

generating an instance of a session provisioning and maintenance (SPM) utility to process a client request at the z/OS host;

determining whether one of a time sharing option (TSO) and an Interactive Productivity System Facility (ISPF) session exists for the client making the request for a respective one of a TSO service and an ISPF service;

when a TSO/ISPF session does not exist, generating a TSO initialization module in a new UNIX System Services (USS) process, wherein said initialization module is a program running within UNIX System Services that generates an individual TSO session;

wherein said generating the TSO initialization module further includes initializing the TSO session with a call to a terminal monitor program (TMP) when the TSO initialization module is started;

when a TSO/ISPF session does exist, transferring request data received by a session interface from the client to a command interface;

saving state data for a client's TSO/ISPF session within a file system between client calls in order to maintain a client's TSO/ISPF sessions over multiple service calls; and when the TSO session is started, said method further comprises:

writing a session file;

starting an ISPF initialization interface, initiated by an ISPF initialization module, wherein said ISPF initialization module is a program running within TSO that allocates data sets required to start ISPF and then starts ISPF;

setting up of a plurality of ISPF data sets;

starting the ISPF;

starting an ISPF command interface module, wherein said ISPF command interface module is a program running within ISPF that processes requests (command data) made on behalf of the user;

waiting on command data;

transferring data from the session interface to the command interface via one of a first-in first-out (FIFO) pipe file and an indicator which points to the existence of the command in an external location, wherein said session interface is a program running within USS that manages generated TSO session(s) and routes service requests to the generated TSO sessions;

executing the command by the command interface;

transferring the executed command to the standard output stream (stdout) as output data;

routing output data to the session interface; and forwarding output data from the session interface to the client.

2. The method of claim 1, further comprising:

retrieving service call details from a standard input stream (stdin); and terminating the TSO and the ISPF session by one or more of:
(1) a timeout, wherein a configurable setting specifies an amount of time which must pass after completion of a last serviced request, wherein, if the time passes without a receipt of another service request, the TSO/ISPF session is terminated;
(2) a shutdown request, wherein, when the command interface receives and processes a shutdown request, the command interface ceases to wait any longer for commands, causing the TSO session to terminate; and
(3) a cancel request, wherein, when the session interface receives a request to cancel the TSO session, the session interface issues the appropriate commands to force termination of a generated TSO address space (s), and wherein a user may only successfully kill sessions which were generated on behalf of the user; and when the TSO session or the ISPF session is terminated, updating the user's session log file to remove the active session ID.

3. A data processing system comprising:

a processor;

a memory system coupled to the processor;

a mechanism for connecting the data processing system to one or more clients via a network;

a utility executing on the processor and which provides the functions of:
generating an instance of a session provisioning and maintenance (SPM) utility to process a client request at the z/OS host;
determining whether one of a time sharing option (TSO) and an Interactive Productivity System Facility (ISPF) session exists for the client making the request for a respective one of a TSO service and an ISPF service;
when a TSO/ISPF session does not exist, generating a TSO initialization module in a new UNIX System Services (USS) process, wherein said initialization module is a program running within UNIX System Services that generates an individual TSO session;
wherein said generating the TSO initialization module further includes initializing the TSO session with a call to a terminal monitor program (TMP) when the TSO initialization module is started;
when a TSO/ISPF session does exist, transferring request data received by a session interface from the client to a command interface;
saving state data for a client's TSO/ISPF session within a file system between client calls in order to maintain a client's TSO/ISPF sessions over multiple service calls; and when the TSO session is started, said utility further comprises codes that when executed provides the functions of:
writing a session file;
starting an ISPF initialization interface, initiated by an ISPF initialization module,
wherein said ISPF initialization module is a program running within TSO that allocates data sets required to start ISPF and then starts ISPF;
setting up of a plurality of ISPF data sets;
starting the ISPF;
starting an ISPF command interface module, wherein said ISPF command interface module is a program running within ISPF that processes requests (command data) made on behalf of the user;
waiting on command data;
transferring data from the session interface to the command interface via one of a first-in first-out (FIFO) pipe file and an indicator which points to the existence of the command in an external location, wherein said session interface is a program running within USS that manages generated TSO session(s) and routes service requests to the generated TSO sessions;
executing the command by the command interface;
transferring the executed command to the standard output stream (stdout) as output data;
routing output data to the session interface; and
forwarding output data from the session interface to the client.

4. The data processing system of claim 3, wherein said utility further comprising code that when executed provides the functions of:

retrieving service call details from a standard input stream (stdin); and terminating the TSO and the ISPF session by one or more of:
(1) a timeout, wherein a configurable setting specifies an amount of time which must pass after completion of a last serviced request, wherein, if the time passes without a receipt of another service request, the TSO/ISPF session is terminated;
(2) a shutdown request, wherein, when the command interface receives and processes a shutdown request, the command interface ceases to wait any longer for commands, causing the TSO session to terminate; and
(3) a cancel request, wherein, when the session interface receives a request to cancel the TSO session, the session interface issues the appropriate commands to force termination of a generated TSO address space (s), and wherein a user may only successfully kill sessions which were generated on behalf of the user; and when the TSO session or the ISPF session is terminated, updating the user's session log file to remove the active session ID.

5. A computer program product comprising:

a computer readable storage medium; and program code on said computer readable storage medium that, when executed within a data communication device generating application data via a network having at least one client device and at least one server device, said program code provides the functionality of:
generating an instance of a session provisioning and maintenance (SPM) utility to process a client request at the z/OS host;
determining whether one of a time sharing option (TSO) and an Interactive Productivity System Facility (ISPF) session exists for the client making the request for a respective one of a TSO service and an ISPF service;

when a TSO/ISPF session does not exist, generating a TSO initialization module in a new UNIX System Services (USS) process, wherein said initialization module is a program running within UNIX System Services that generates an individual TSO session;

wherein said code for generating the TSO initialization module further comprises code for initializing the TSO session with a call to a terminal monitor program (TMP) when the TSO initialization module is started;

when a TSO/ISPF session does exist, transferring request data received by a session interface from the client to a command interface;

saving state data for a client's TSO/ISPF session within a file system between client calls in order to maintain a client's TSO/ISPF sessions over multiple service calls; and when the TSO session is started, said code further comprises code for:
  writing a session file;
  starting an ISPF initialization interface, initiated by an ISPF initialization module, wherein said ISPF initialization module is a program running within TSO that allocates data sets required to start ISPF and then starts ISPF;
  setting up of a plurality of ISPF data sets;
  starting the ISPF;
  starting an ISPF command interface module, wherein said ISPF command interface module is a program running within ISPF that processes requests (command data) made on behalf of the user;
  waiting on command data;
  transferring data from the session interface to the command interface via one of a first-in first-out (FIFO) pipe file and an indicator which points to the existence of the command in an external location, wherein said session interface is a program running within USS that manages generated TSO session(s) and routes service requests to the generated TSO sessions;
  executing the command by the command interface;
  transferring the executed command to the standard output stream (stdout) as output data;
  routing output data to the session interface; and
  forwarding output data from the session interface to the client.

6. The computer program product of claim 5, said program code further comprising code for:

retrieving service call details from a standard input stream (stdin); and terminating the TSO and the ISPF session by one or more of:
  (1) a timeout, wherein a configurable setting specifies an amount of time which must pass after completion of a last serviced request, wherein, if the time passes without a receipt of another service request, the TSO/ISPF session is terminated;
  (2) a shutdown request, wherein, when the command interface receives and processes a shutdown request, the command interface ceases to wait any longer for commands, causing the TSO session to terminate; and
  (3) a cancel request, wherein, when the session interface receives a request to cancel the TSO session, the session interface issues the appropriate commands to force termination of a generated TSO address space(s), and wherein a user may only successfully kill sessions which were generated on behalf of the user; and when the TSO session or the ISPF session is terminated, updating the user's session log file to remove the active session ID.

* * * * *